United States Patent

Lissau

[15] 3,643,510

[45] Feb. 22, 1972

[54] FLUID DISPLACEMENT PRESSURE GAUGES

[72] Inventor: Frederic Lissau, Forest Hills, N.Y.

[73] Assignee: Liquidonics Inc., Westbury, N.Y.

[22] Filed: Dec. 17, 1969

[21] Appl. No.: 885,933

[52] U.S. Cl. .................................................73/393, 73/406
[51] Int. Cl. ..........................................................G01l 19/04
[58] Field of Search....................73/406, 393, 410, 385, 397, 73/408, 386; 116/42 FP

[56] References Cited

UNITED STATES PATENTS

| | | | |
|---|---|---|---|
| 1,923,413 | 8/1933 | Becker | 73/406 UX |
| 3,140,613 | 7/1964 | Hasegawa | 73/407 |

*Primary Examiner*—Donald O. Woodiel
*Attorney*—Jacob B. Burke

[57] ABSTRACT

Fluid displacement pressure gauges have pressure responsive elements which displace gauging fluid in readout tubes. Gauging fluid can be located inside or outside the pressure responsive elements. The pressure responsive elements may be capsules with flexible walls or tubular members with flat, curved, corrugated or round walls. Temperature-compensating means and spring rate adjustment means are provided to improve accuracy of reading precision instruments. Hermetically sealed gauges can be used in any position. Readout tubes may have bores of different sizes to improve readout resolution. Differently colored gauging fluids in the readout tubes serve to improve readability. Automatic compensation means may be provided to compensate for variations in fluid volume due to temperature changes. Readout tubes can be provided with means to eliminate parallax in reading scales. Readout tubes and scales can be coiled to improve readout resolution without increasing overall scale height.

14 Claims, 33 Drawing Figures

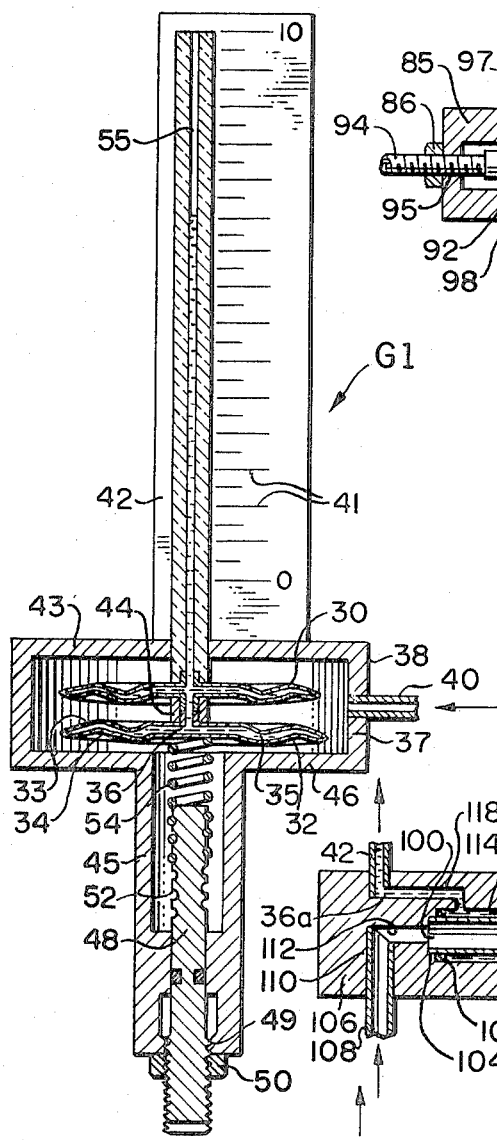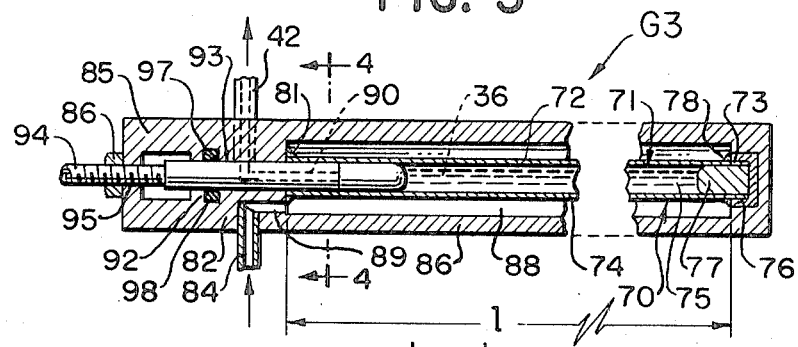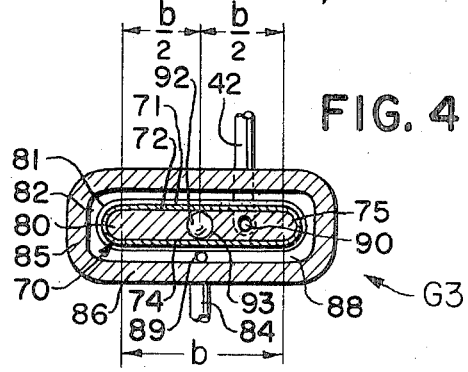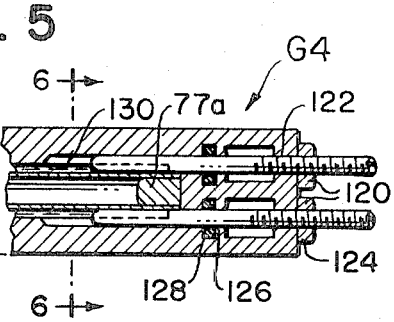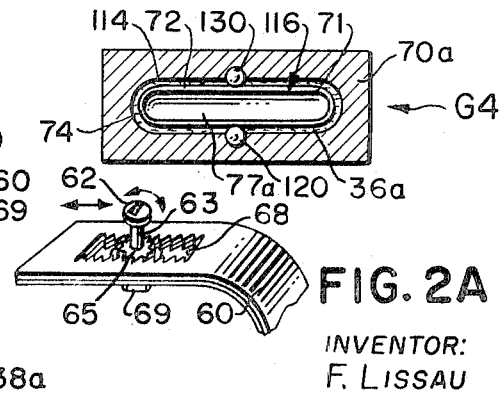
INVENTOR:
F. LISSAU
BY J. B. Burke
ATTORNEY

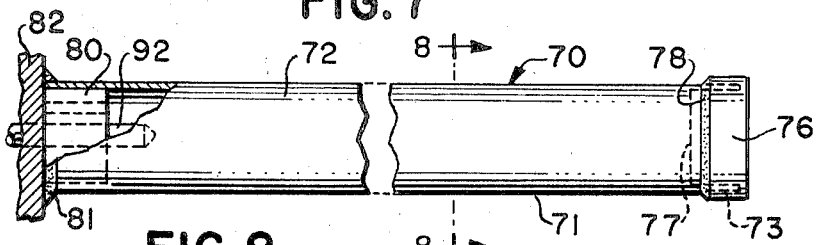
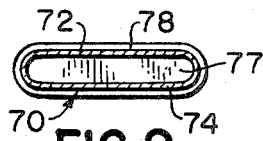
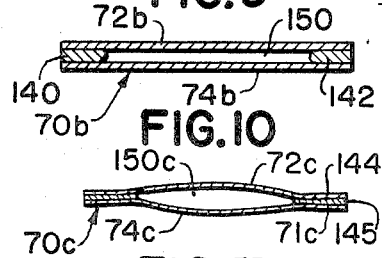
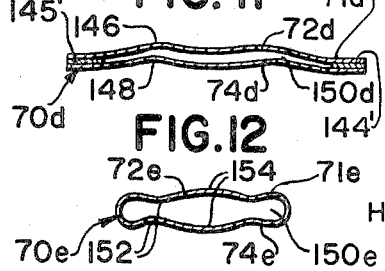
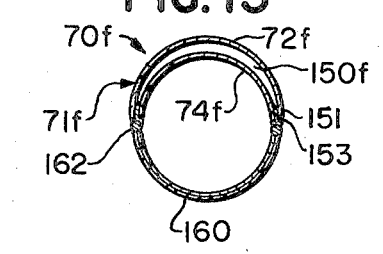
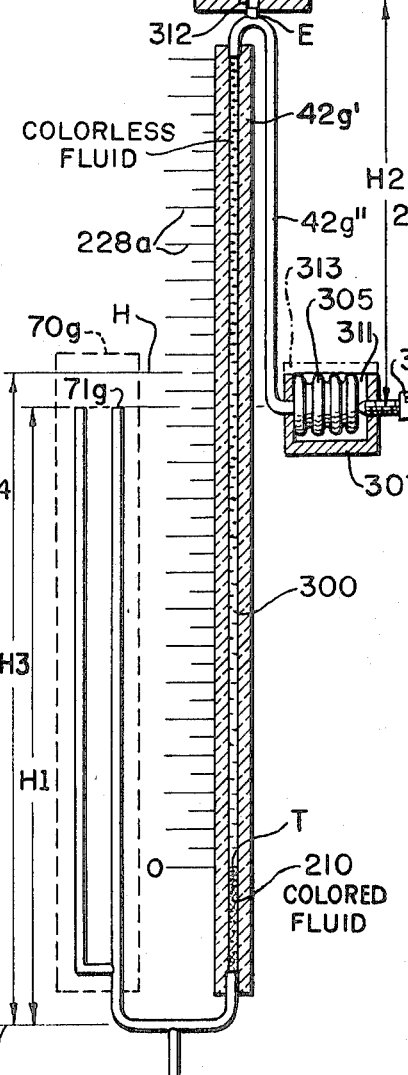
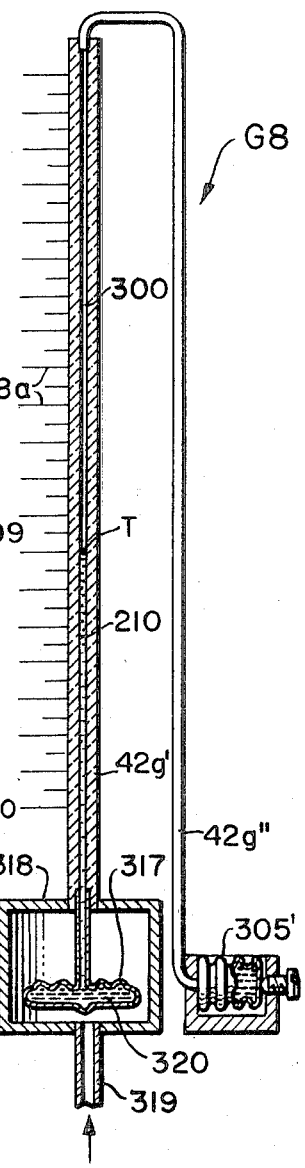

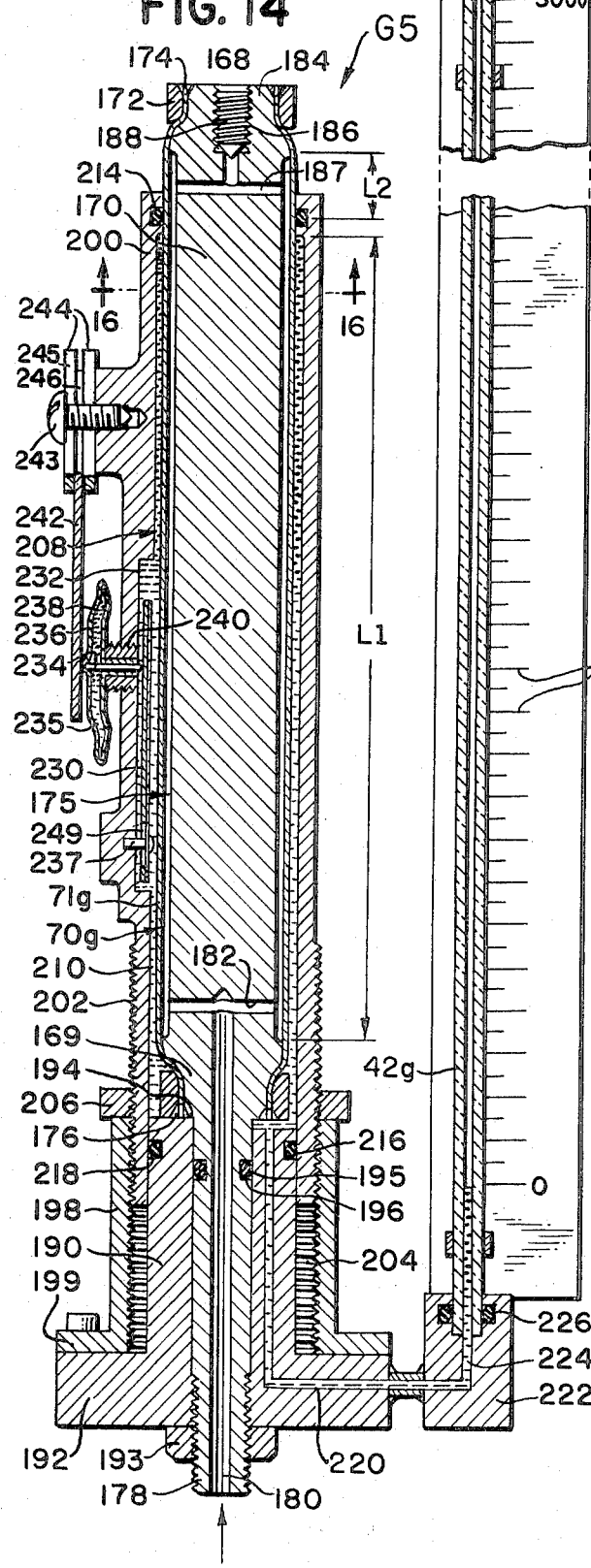
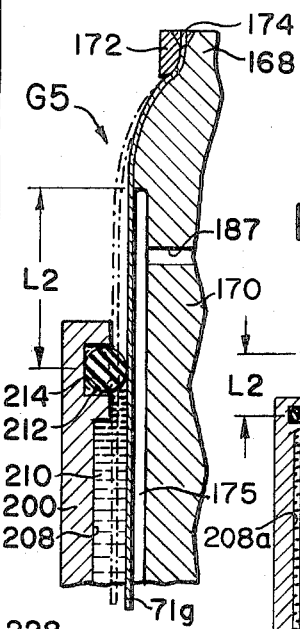
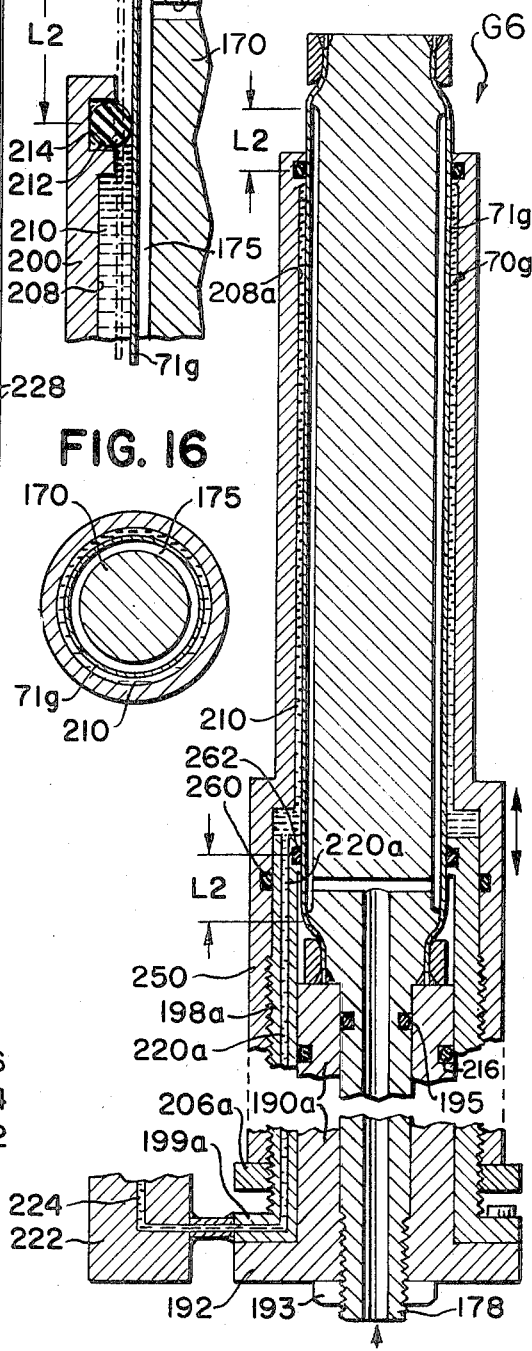

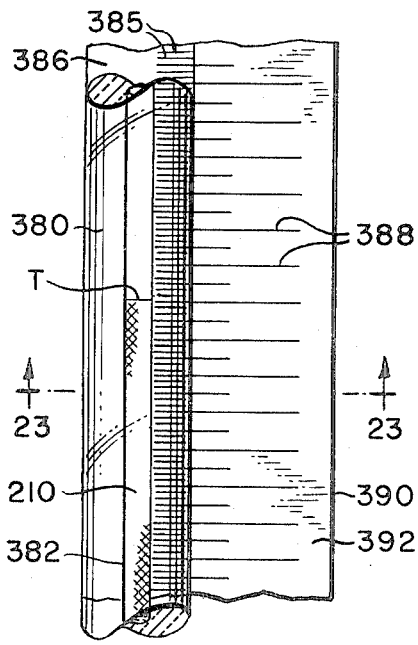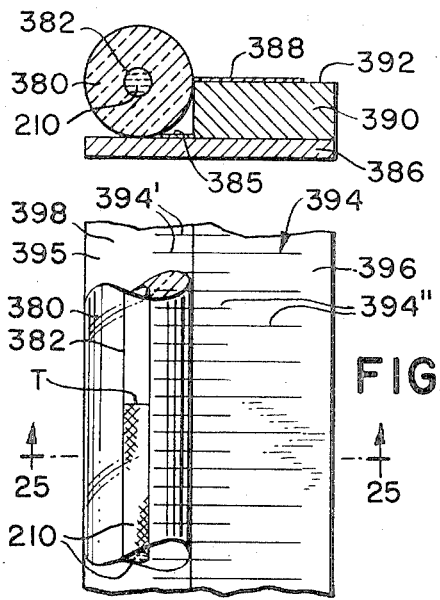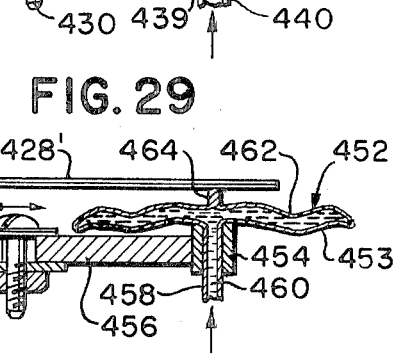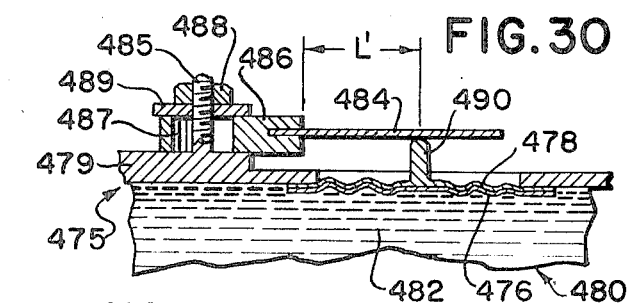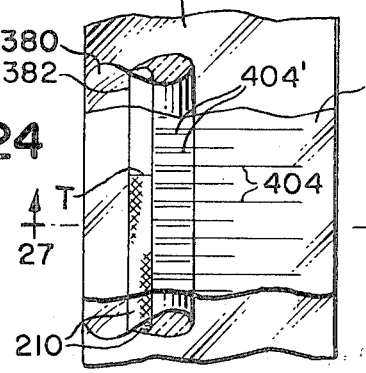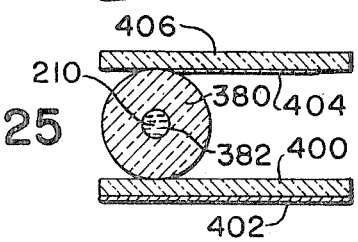

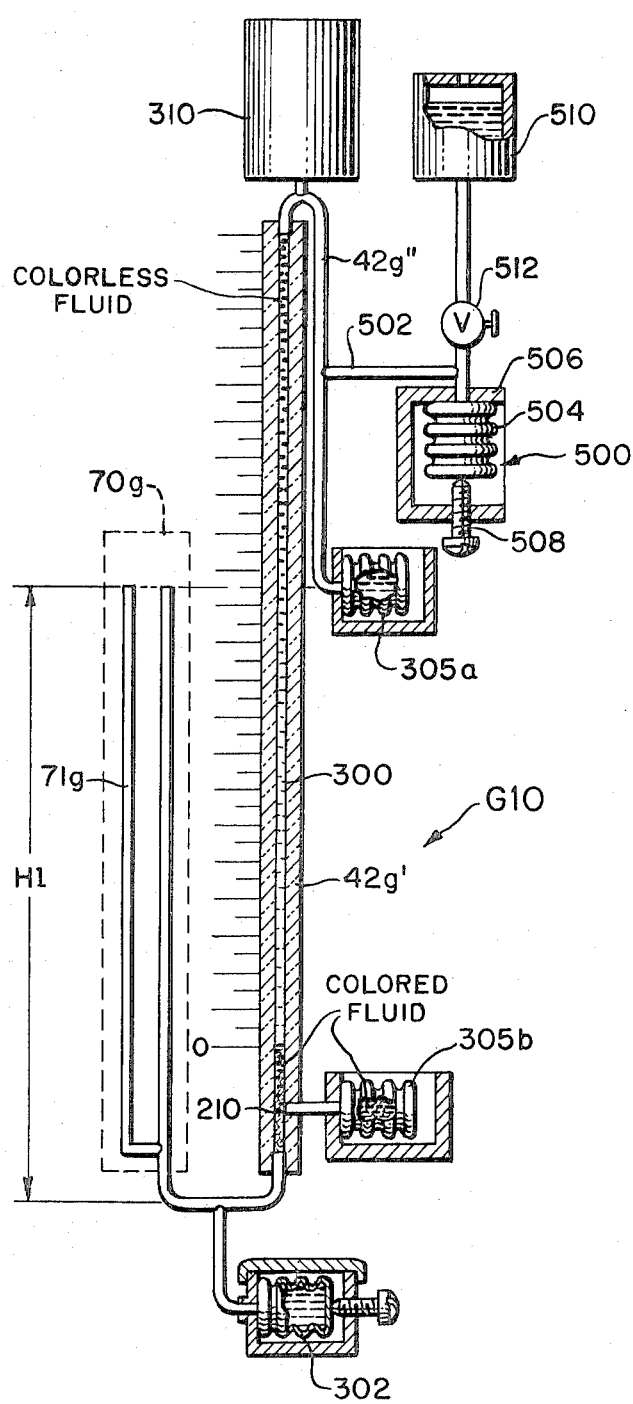
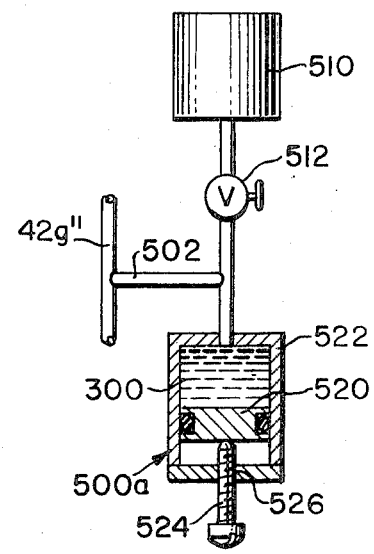

FLUID DISPLACEMENT PRESSURE GAUGES

Fluid displacement pressure gauges have important advantages over pressure gauges which employ mechanical parts such as levers, gears, pinions and bearings which move in response to variations in applied pressure. Among these advantages may be mentioned the following:

1. Elimination of mechanical movements.
2. Pressure sensitive elements are capable of improved linearity of response.
3. The entire mechanism can be hermetically sealed.
4. Improved purging of the pressure sensitive element is possible.
5. Hysteresis can be substantially avoided.
6. Backlash can be eliminated.
7. Split resolution of readout is possible.
8. High resistance to pressure surges can be obtained.
9. Internal damping can be provided.
10. Vibration and chattering of readout can be eliminated.
11. Readout can be vertical resulting in space saving and better readability.
12. Relatively lower cost of manufacture.

Fluid displacement pressure gauges have heretofore been known which employed a single circular diaphragm as a pressure responsive element. Communicating with the diaphragm is a narrow bore tube containing fluid. When the diaphragm is axially flexed by applied pressure the fluid is displaced in the tube. Associated with the tube is a readout scale. In this type of gauge a large readable displacement of fluid in the tube can be had by a relatively small axial movement of the diaphragm. This effect is sometimes referred to as "hydraulic gearing."

Where pressure gauging requires extreme accuracy and reliability, the prior fluid displacement pressure gauges have not proven wholly satisfactory. This is due to their failure to solve satisfactorily the following difficult problems:

1. Linearity—It is necessary that the pressure sensitive element be absolutely linear in response over the specified operating range. The fluid displacement tube must have a uniform bore throughout. No correction for nonlinearity is possible in this type of gauge. A linear pressure responsive sensing element is required which can be matched to a linear readout scale, otherwise the readout scale must be specially calibrated and engraved to match a particular pressure-sensing element. This is objectionable and expensive and results are not always reliable.
2. Rate of Displacement—Since no two pressure-sensing elements will predictably have exactly the same fluid displacement rate, effective rate adjustment means must be provided.
3. Temperature Compensation—Since the thermal coefficient of expansion of fluid substantially greater than those of metals generally used in pressure-sensing elements, temperature compensation means must be provided when uniformity of response of a gauge over a prescribed temperature range is required. Due to the high expansion rate of fluids it is imperative to employ a minimum volume of gauging fluid, otherwise a large volume of gauging fluid will act like a thermometer.

In view of the above critical requirements and problems, bellows-type gauges have achieved very limited usage, being largely restricted to very low pressure ranges and to instruments where extreme accuracy of pressure readings is not required.

It has also been proposed heretofore to employ flexible diaphragms as pressure-sensing elements in fluid displacement gauges. However, these diaphragms lack the necessary features of linearity, rate adjustment means and temperature compensation means described above, so that their usage in fluid displacement gauges has been very much restricted.

The present invention is directed at overcoming the difficulties and disadvantages of prior fluid displacement gauges in such ways that full benefit is obtained of all the advantages listed above of this type of gauge. According to the invention, fluid displacement gauges can be constructed to operate in prescribed pressure ranges as high as 50,000 p.s.i.g. as well as in any specified lower range. The gauges employ pressure-sensing elements which conform with essential requirements of perfect linearity over the prescribed pressure range, rate adjustment, ability to sustain excessive pressure without damage, extended life cycle, reliability, relatively low cost, etc.

In one form of the invention an aneroid-type capsule is employed. This capsule has two closely spaced concentrically corrugated diaphragms joined at their peripheries and defining a narrow chamber. The capsule is provided with spring means for rate adjustment and thermal compensation. In another form of the invention the pressure responsive element has flat sides. Rate adjustment is accomplished by pins movably inserted between sides of the element. Other pressure responsive elements are corrugated or arcuate in form. In a further form of the invention the pressure-sensing element is tubular in form. This element operates by expanding radially under fluid pressure. A bimetallic element is employed for temperature compensation. Rate adjustment is accomplished by a threaded cylindrical support for the tubular element which is axially adjustable on the threaded support.

The invention further involves an improved readout system for the fluid displacement pressure gauge. A precision bore, transparent sight tube is arranged to be usable in any position. No error in reading results due to the height of the fluid column. One way this is done is by filling the sight tube with two liquids, one of which is colored and the other one of which is colorless. The colored fluid moves in the sight tube. The colorless fluid moves with the colored fluid, filling the tube and providing a mechanical balance for the column height of the colored fluid. The sight tube is further provided with means to eliminate parallax to insure accuracy in reading the scale associated with the sight tube.

The invention will be explained in further detail with reference to the drawings, wherein:

FIG. 1 is a vertical sectional view of a first fluid displacement pressure gauge according to the invention.

FIG. 2 is a fragmentary sectional view similar to a portion of FIG. 1 showing a second pressure gauge.

FIG. 2A is an enlarged perspective view of a portion of an adjustable spring in the second pressure gauge.

FIG. 3 is a fragmentary longitudinal sectional view of a third gauge.

FIG. 4 is a cross-sectional view taken on line 4—4 of FIG. 3.

FIG. 5 is a fragmentary longitudinal sectional view of a fourth gauge.

FIG. 6 is a cross-sectional view taken on lines 6—6 of FIG. 5.

FIG. 7 is a plan view of a pressure-sensing element.

FIG. 8 is a cross-sectional view taken on line 8—8 of FIG. 7.

FIGS. 9–13 are cross-sectional views similar to FIG. 8 of other pressure-sensing elements.

FIG. 14 is a longitudinal sectional view of a fifth pressure gauge.

FIG. 15 is an enlarged view of a portion of FIG. 14.

FIG. 16 is a cross-sectional view taken on line 16—16 of FIG. 14.

FIG. 17 is a longitudinal sectional view of a portion of a sixth gauge.

FIGS. 18, 19, 21, 31 are partial diagrammatic longitudinal sectional views of seventh, eighth, ninth and 10th pressure gauges respectively.

FIG. 22 is an elevational view of a portion of another readout tube and associated scale arranged to minimize or eliminate parallax.

FIG. 23 is a cross-sectional view taken on line 23—23 of FIG. 22.

FIG. 24 and FIG. 26 are fragmentary elevational views similar to FIG. 22 of two other fluid displacement readout tubes and scales arranged to eliminate parallax.

Figure 20:
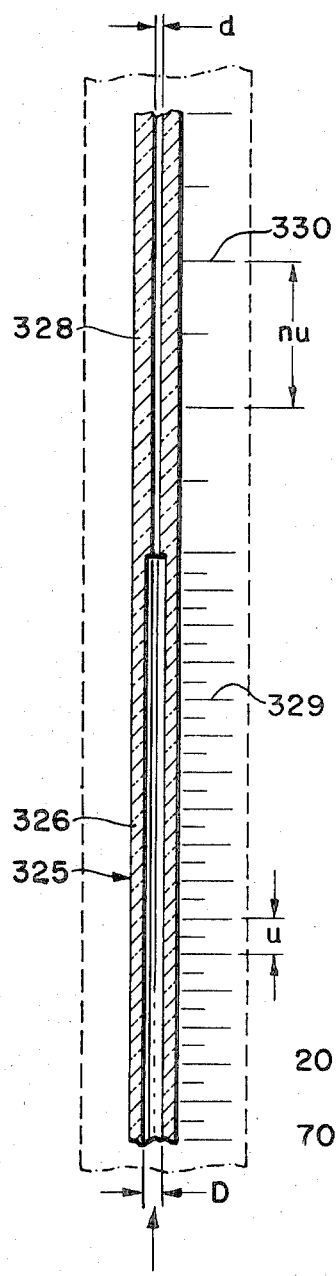
FIG. 20 is a longitudinal sectional view of a portion of a fluid displacement readout tube and associated scale.

FIGS. 25 and 27 are cross-sectional views taken on lines 25—25 and 27—27 of FIGS. 24 and 26 respectively.

FIG. 32 is a fragmentary sectional view similar to a part of FIG. 31 showing an alternate form of means for fluid volume adjustment.

FIGS. 28, 29 and 30 are cross-sectional views of three fluid pressure-sensing elements with means for temperature change compensation.

In the following detailed description, corresponding parts having like functions in the several structures are identically numbered.

Referring first to FIG. 1, there is shown a first fluid displacement pressure gauge G1 in which are two pressure-sensing capsules 30, 32 connected in series at their centers. These capsules are referred to herein as "aneroid capsules" or "aneroid-type capsules." Each capsule has two circular, springy diaphragms 33, 34 with concentric corrugations and defining closed chambers 35 for containing a suitable liquid 36. The chambers are very short axially as compared with their diameters and thus contain very small quantities of liquid 36. The capsules are enclosed in a rigid casing 38. In sidewall 37 of the casing is fitted a pipe 40 through which pressurized liquid or gas is fed to casing 38. The pressure is externally applied to the capsules. Increase in externally applied pressure will tend to compress or reduce chambers 35 against spring bias in the diaphragms. Decrease in pressure will tend to expand or enlarge the chambers as the diaphragms 33, 34 respond elastically. Capsule 30 is secured to the lower end of a straight transparent tube 42 fitted in end wall 43 of the casing. Adjacent tube 42 is a linear scale 41 on which the height of liquid 36 in the tube is read. A cylindrical spacer 44 is secured to capsule 30 and capsule 32 is secured to spacer 44. Casing 38 has a tubular extension 45 integral with end wall 46 and axially aligned with tube 42. A shaft 48 extends axially of extension 45. The shaft is slotted and threaded at its outer end and is engaged with threading 49 at the outer end of extension 45. A nut 50 on the shaft enables the shaft to be locked in any desired position of adjustment axially of extension 45. The inner or upper end of the shaft is formed with a helical groove or thread 52. A coil spring 54 is engaged in groove 52 and extends axially beyond shaft 48. By turning shaft 48 it can be advanced or retracted axially to vary the number of turns of coil spring 54 which expand or contract when capsules 30, 32 respond to pressure variations in casing 38. By this arrangement the spring loading on the capsules can be fixed at a certain magnitude while the number of coils of the spring which are active can be changed. Stated otherwise, spring loading is constant but spring rate is variable. It will be noted that the spring rate of the flexible diaphragms of the capsules is combined with the variable spring rate of spring 54 to generate a combined variable spring rate. This arrangement allows adjustment of readout in response to pressure applied to the capsules. Liquid 36 moves linearly up and down in the straight narrow bore 55 of tube 42.

FIG. 2 shows part of a second pressure gauge G2 which is similar to gauge G1 in that two aneroid capsules 30, 32a are employed in axial alignment with tube 42 containing fluid 36. The capsules are enclosed in casing 38a. Pressure is externally applied to the capsules via pipe 40a connected to bottom wall 46a of the casing. An arcuate leaf spring 60 is provided for variable rate adjustment. The lower flat end of the spring bears on a central projection 61 formed at the bottom of capsule 32a. A screw 62 is rotatably disposed in hole 64 in the upper wall 43a of the casing. The shank 63 of the screw may be formed with gear teeth or a small spur gear 65 can be fitted on the screw. The gear is engaged with gear teeth formed in opposite side edges of a slot 68. The slot is located near the upper end of the spring abutting casing wall 43a. Nut 69 on shank 63 holds the spring in place. The spring slides laterally toward and away from the aligned axes of the capsules, tube and casing when screw 62 is turned in one direction or the other to vary the spring rate of the assembly. Spring 60 is preferably formed as a bimetallic member which varies its pressure on the capsules with changes in temperature in the casing. As gauging liquid 36 expands during increasing temperature the load imposed by spring 60 will decrease due to expansion of the bimetal. This decreased load in combination with the expansion of the capsules due to increased temperature will result in a slightly expanded volume of chambers 35. This expanded volume will be equal to the expansion of liquid 36 so that the change in temperature will be compensated. As a result even though the temperature of liquid 36 increases or decreases there will be no resulting change in the height of liquid 36 in tube 42. Gauge G2 is thus provided with variable spring rate adjustment means with temperature compensation means. Fluid displacement pressure gauges G1 and G2 employing aneroid-type capsules will be most effective in lower pressure ranges up to approximately 10 to 100 p.s.i.g.

FIGS. 3 and 4 show parts of pressure gauge G3 adapted for linear response up to approximately 500 p.s.i.g. The pressure responsive element 70 also shown in FIGS. 7 and 8 comprises a tubular member 71 with long, wide, flat flexible opposite walls 72, 74, and narrow curved lateral walls 75. The distal end of the tubular member is inserted in a groove 73 in a cap 76 having a plug 77 inserted into this end of the tubular member. A continuous weld 78 seals the tubular member to the cap. The fluid inlet end of the tubular member is engaged on a plug 80 integral with sidewall 82 of a closed flat rectangular casing 85. Continuous weld 81 secures the end of member 71 on plug 80. Pressurized fluid is fed via pipe 84 connected to bottom wall 86 of the casing and opening via passage 89 into chamber 88 inside the casing but external of sensing element 70. Fluid displacement tube 42 is secured to casing 85 and opens into tubular member 71 via passage 90 in plug 80. Tubular member 71 contains fluid 36 which is displaced via passage 90 into and out of tube 42. A pin 92 is slidably fitted in a bore 93 in sidewall 82 and extends centrally into the inlet end of member 71. A threaded bolt 94 is secured to the outer end of pin 92 and is adjustably engaged in threaded hole 95 in wall 82. Nut 96 locks the bolt and pin in place in casing 85. A sealing ring gasket 97 is disposed in a groove 98 to seal pin 92 in casing 85.

Pin 92 serves as a rate adjustment member. It will be noted in FIG. 4 that the flat portions of tubular member 71 having a width "$b$" are each divided into two effective supporting surfaces each having a width $b/2$ adjacent to the rate adjustment pin 92. Since these surfaces act as supporting beams, and since the deflection of a uniform beam under pressure is proportional to the fourth power of width "$b$," it will be evident that by dividing the beam into two beams of width $b/2$ the spring rate of the pressure responsive element will be changed substantially. Thus as the rate-adjusting pin is advanced into sensing element 70, the effective work length of element 70 shortens, i.e., the element becomes stiffer.

In pressure gauge G3 the pressure to be measured is applied to the exterior of pressure-sensing element 70. FIGS. 5 and 6 show another fluid displacement pressure gauge G4 in which the pressure to be measured is applied inside the pressure-sensing element. In pressure gauge G4, pressure-sensing element 70a comprises a tubular member 71 with flat, flexible, opposite sidewalls 72, 74. End 100 of element 70 is secured by a weld 102 in recess 104 of casing 106. Pressurized fluid to be gauged is passed into element 70a via a conduit 108 secured in a bore 110 and communicating with the element via a bore 112. Walls 73, 14 are spaced slightly from adjacent inner sides 114 of chamber 116. The other end of element 70a is closed by a plug 77a welded in place. Fluid 36a fills chamber 116 and extends up gauging tube 42 which communicates with external chamber 116 via a passage 118. Two rate-adjusting pins 120 are axially adjustable in chamber 116. The outer ends of the pins are threaded and are engaged in threaded holes 122. Nuts 124 hold the pins in place. The pins are surrounded by sealing rings or gaskets 126 in grooves 128. Outer sides of the pins are guided in grooves 130 in sides 114 of chamber 116 in the casing. It will be noted that the rate adjustment pins are sealed in the low-pressure chamber 116 and no sealing rings are required in the high-pressure side of the assembly. This is also true in gauge G3 where high pressure is applied via pipe 84. The gauge G4, as pressure is internally applied, walls 72, 74 bend or bow outwardly to reduce the volume of chamber 116, and fluid 36a rises in tube 42.

FIGS. 7-13 show pressure-sensing elements having wide sidewalls but different cross-sectional configurations. Element has flattened tube 71 which has already been described in connection with gauges G3 and G4. Pressure-sensing element 70b shown in FIG. 9 has flat, flexible sidewalls and closely spaced top and bottom walls 72b, 74b closed at lateral sides by welded plugs 140, 142 extending the full length of both sides of the element to define chamber 150. Pressure-sensing element 70c shown in FIG. 10 comprises a flattened tubular member 71c with outwardly bowed flexible top and bottom walls 72c, 74c to define chamber 150c. Lateral marginal portions 144 of the element are secured by welds 145. Pressure-sensing element 70d shown in FIG. 11 comprises a flattened tubular member 71d with corrugations 146, 148 extending along the full lengths of opposite wide, flexible sidewalls 72d, 74d defining chamber 150d. Welds 145' seal edges 144'. Pressure-sensing element 70e shown in FIG. 12 comprises a flattened tubular member 71e with opposite flexible sidewalls 72e, 74e formed with opposing corrugations 152, 154 internally convex and concave respectively and defining chamber 150e. Pressure-sensing element 70f shown in FIG. 13 comprises a tubular member 71f which is crescent shaped in cross section. The opposing walls 72f and 74f are respectively internally concave and convex and define chamber 150f therebetween. Edges 151 are secured by welds 153. When pressure is applied inside of tubular member 71f it tends to flatten out; and when pressure is applied externally to member 71f it tends to curl up. An outwardly bowed bimetallic thermal compensator plate 160 may be secured by marginal welds 162 to edges 151 of member 71f. The flattened tubular members shown in FIGS. 7-13 have the characteristic that the long, wide surfaces exposed to pressure act as beams in bending. Diaphragm-type stresses occur only in the vicinity of end welds as shown in FIG. 7. The elements can be made as long as desired to minimize the diaphragm-type stresses while maximizing the beam bending which effects maximum linear displacement of gauging fluid.

The flattened type pressure-sensing elements shown in FIGS. 7-13 are generally useful in fluid displacement pressure gages in the medium pressure range. FIGS. 14, 15 and 16 show a fluid displacement pressure gauge G5 capable of measuring pressures as high as 50,000 p.s.i.g. This gauge has a pressure responsive element 70g comprising a cylindrical or tubular member 71g which is round in cross section as best shown in FIG. 16. This member is preferably made of high-strength steel. The tubular member 71g is spun or swaged over reduced end portions 168, 169 of a cylindrical central core 170 which extends axially of member 71g. Rings 172, 173 are secured over the ends of member 71g at reduced portions 168, 169. The assembly may then be provided with end sealing welds 174, 176. A cylindrical chamber 175 is defined between tubular member 71g and core 170. A tubular extension 178 is provided at one end of the core. This extension has an axially arranged bore 180 communicating with transverse bore 182 which opens into chamber 175. Pressurized fluid can be applied to chamber 175 via the tubular extension 178. Chamber 175 is such as to allow good pressure distribution inside the chamber and to facilitate flushing and purging of the interior of tubular member 71g. At end 184 a threaded opening 186 is provided in core 170. This opening communicates with chamber 175 via diametral bore 187. Opening 186 is closed by a removable plug 188. This arrangement is provided for flushing and purging the chamber 175. A valve can be provided in place of plug 188. Alternatively a fitting can be inserted in threaded opening 186 and a remotely located valve can be connected to the fitting via a pipe.

Core 170 is supported by a cylindrical sleeve 190 provided with an annular radial flange 192 at its outer end. Tubular extension 178 extends axially through sleeve 190 and is held by nut 193. Shoulder 194 of the core abuts the inner end of sleeve 190. A ring seal 195 is provided in groove 196 to prevent fluid leakage between the tubular extension 178 and sleeve 190. A cylindrical support 198 is secured to sleeve 190 and is provided with radial flange 199 bolted to flange 192. A cylindrical housing 200 surrounds tubular member 71g. End portion 202 is externally threaded and adjustably fitted in threaded bore 204 of support 198. A nut 206 engaged on end portion 202 of the housing engages support 198 to lock the housing in stationary position on support 198. A cylindrical chamber 208 is defined around tubular member 71g. This chamber contains gauging fluid 210. A ring seal 212 is provided in a groove 214 inside the housing at its upper end. A further ring seal 216 is provided in groove 218 of sleeve 190 to prevent fluid leakage between the sleeve and housing. Sleeve 190 is provided with a bore 220 communicating with chamber 208. A block 222 is secured to flange 192. Bore 220 communicates with bore 224. Gauging tube 42g is fitted block 222 and is sealed by O-ring 226. The level of fluid in vertical tube 42g is read on vertical scale 228 adjacent the tube. The gauging fluid is located at zero ("0") reading on the scale when pressure of fluid in chamber 175 is zero.

Rate adjustment in gauge G5 is provided by adjusting length L1 which is the distance between the upper end of outer chamber 208 and the lower end of inner chamber 175. This is accomplished by adjustably positioning housing 200 in support 198 and locking it in place by tightening nut 206. The displacement rate is proportional to distance L1. The shorter distance L1 is the less displacement of gauging fluid 210 takes place.

Tubular member 71g expands and contracts radially and circumferentially substantially linearly in distance L1. Seal 212 is placed close to the upper end of chamber 208 containing gauging fluid 210. FIG. 15 shows that the wall of tubular member 71g moves laterally uniformly in chamber 208 up to seal 212 between solid and dotted lines.

Pressure-sensing element 70g is effectively a pressure responsive vessel without end caps or plugs such as shown in FIGS. 3 and 7. This construction has a number of advantages. Due to the internal balance of applied forces to tubular member 71g in length L1, meridional stresses which might be generated by end caps are eliminated and hoop stresses predominate. The end welds 174, 176 are seal welds. Distance L2 between seal 214 and the upper end of chamber 175 can be made as great as necessary by adjusting housing 200 in support 198. The hydraulic gearing effect is maximized since member 71g expands radially in the range of about 0.001 to 0.002 inches, while fluid 210 can move up scale 228 10 inches or more. Core 170 provides rigidity and mechanical strength to the assembly. Gauge G5 can measure pressures up to 50,000 p.s.i.g.

Thermal compensation means are provided in gauge G5 to insure constant readings over an extended temperature range such as −25° F. to +125° F. as currently required for high-precision laboratory gauges. Thermal compensation is necessary because of the high rate of thermal expansion of gauging fluid 210 as compared with the metallic parts of the gauge. Gauge G5 employs a bimetallic strip 230 located in a lateral recess 232 in housing 200 opening into chamber 208. Pin 234 is secured to the outer diaphragm 235 of an aneroid-type capsule 236 and extends axially to strip 230. The strip is secured at one end by a rivet 237 so that it flexes and moves pin 234 axially to expand and contract capsule 236. The capsule is filled by gauging fluid 210. The inner diaphragm 238 of the capsule is secured to a threaded fitting 240 engaged in a hole in the side of housing 200. In order to provide fine adjustment of the thermal expansion rate a flat leaf spring 242 is externally mounted on housing 200 by means of bolt 243 and spacers 244. The upper end of spring 242 and the spacers are longitudinally slotted. The spring is longitudinally slidable with the spacers when bolt 243 is loosened. The bolt extends through slots 245, 246 in the spacers and spring. This enables adjustment of the length of spring 242 which bears on the outwardly projecting center of diaphragm 235. If desired it is possible as an alternative to adjust the effective length of bimetallic strip 230. One way this can be done is by means of a slot 249 in the strip at rivet 249. However this type of fine adjustment would require disassembly of the gauge which may not always be feasible.

FIG. 17 shows another fluid displacement gauge G6 which is generally similar to gauge G5. Pressure-sensing element 70g in gauge G6 employs tubular expansion member 71g. Housing 200a which surrounds member 70g is formed with an integral tubular base 250 which is internally threaded and is axially adjustable on cylindrical support 198a. This support is externally threaded. Its lower flange 199a is bolted to flange 192 of sleeve 190a. Passage 220a is formed in support 198a and communicates with chamber 208a to pass gauging fluid to the gauging tube 42g shown in FIG. 14 via coupling block 222 which is secured to flange 199a. Support 198a is externally threaded to adjustably engage housing 200a. Nut 206a holds the housing in place on support 198a. Ring seals 195 and 216 seal tubular extension 178 to sleeve 190a, and seal sleeve 190a to support 198a. Ring seal 260 seals housing extension 250 to support 198a. Ring seal 262 seals the lower end portion of tubular member 71g to support 198a. This arrangement insures optimum displacement linearity for member 71g at both ends, since seals 214 and 262 are located close to the ends of outer chamber 208a while chamber 175 and tubular member 71g both extend beyond the seals by distances L2, L2'. Distance L2' is fixed but distance L2 is variable to vary the volume of chamber 208a which contains gauging fluid 210.

The pressure gauges G1–G6 described above employ a pressure-sensing element and a contracting or expanding chamber communicating with a transparent sight tube having a precision bore. The chamber contains a colored fluid. The fluid level in the sight tube is at "0" on the associated scale when no pressure is applied to the pressure-sensing element. As pressure is increased in the chamber the fluid level in the sight tube will respond to show a precise reading on the associated scale. The gauging fluid in a precision gauge should have the following properties:

1. The fluid must have a relatively low viscosity in the temperature range in which the gauge operates.
2. The fluid must have a low vapor pressure at the highest point in the temperature range of operation.
3. The fluid must be chemically inert and compatible with seals and metals used in construction of the gauge.
4. The meniscus at the top of the fluid in the tube should appear straight and sharp.
5. The gauge should be usable in any position.
6. No error should result due to height of the fluid column in the tube.
7. The readout fluid column should not break apart under conditions of shock and vibration.

To meet the above requirements it has been found necessary to fill the sight tube with a light-colored, colorless or transparent second fluid which must have properties similar to those of the darker-colored gauging fluid. The two fluids must have similar specific gravity and must be mutually not miscible. Furthermore the two fluids should have a similar degree of surface tension and similar wetting properties. Pressure gauge G7 shown in FIG. 18 employs two gauging fluids as described. Pressure gauge G7 has a pressure-sensing element 70g in which the tubular expansion member shown diagrammatically defines part of cylindrical chamber 208. Colored fluid 210 fills chamber 208 and extends upwardly in vertical tube 42g' when the pressure in chamber 208 is increased. Colorless fluid 200 fills tube 42g' above the upper level T of the colored fluid. At its upper end E tube 42g' is bent to inverted U-form to define another leg 42g'' which extends parallel to main section 42g'. A first bellows 302 is connected to tube 42g' at its lower end and is filled with colored fluid 210. This bellows has an adjustment screw 304 bearing on one end of the bellows and engaged in frame 306 on which the bellows is mounted. By turning screw 304 it is possible to add or withdraw fluid in order to set the zero point T precisely with respect to scale 228a. A second bellows 305 is connected to the lower end of leg 42g''. Bellows 305 is mounted in casing 307 and has an end adjustment screw 309.

At the upper end E of tube 42g' is a closed reservoir 310 which communicates with tube 42g' via a stub tube 312. A piston 314 is axially slidable in reservoir 310. This piston is loaded by a coil spring 316. Reservoir 310 serves as an overflow reservoir. When the gauge is overpressured the colored fluid 210 passes the uppermost end E of tube 42g'. Pressure increases in bellows 305 whose expansion is limited by adjustment screw 309. Further increase in pressure in tube 42g' overcomes the load of spring 316 and the colored fluid enters reservoir 310. Upon reduction of pressure in tube 42g' the colored fluid will discharge first from reservoir 310. When the reservoir has discharged the expansion bellows 305 is free to feed colorless fluid up into leg 42g''. The assembly should be adjusted so that at maximum contraction of chamber 208 (or expansion of tubular member 71g) the colored fluid will only partially fill reservoir 310. This will avoid intermingling of colored and colorless fluids by preventing the colored fluid from entering bellows 305.

In order to explain further the operation of gauge G7 the pressure heads must be considered. A column of gauging fluid in a vertical sight tube will develop a pressure at its base which is proportional to the fluid density and column height, generally referred to as the "head." A head of 27.67 inches of water or 2.036 inches of mercury is equivalent to 1 p.s.i.g. When the sight tube of a displacement pressure gauge such as 42g' in FIG. 18 is disposed in a vertical position the following heads are involved with respect to base line B:

Head H1 is the head determined by the height of gauging fluid in pressure-sensing element 70g.

Head H2 is the negative head of fluid in leg 42g''.

Head H3 is the head of pressurized fluid applied to pressure-sensing element 70g.

Head H4 is the positive head of the column of fluid including colored and colorless fluids in the gauging tube 42g'.

The expansion bellows 305 is located at the highest point of the pressure-sensing element 70g. If the expansion bellows 305 were located at the height of the upper end E of the tube 42g', a head H4 would be present at all times. This head would not be detrimental if the gauge were always to be used in a vertical position. In such a case the gauge would be adjusted by means of screw 304 at bellows 302 to read 37 0" on scale 228 at zero pressure condition of the gauge. However, if tube 42g' were disposed in a horizontal position, an error would result due to loss of head H4. Leg 42g'' provides negative head H2 which prevents the error which would otherwise occur if tube 42g' were horizontal.

By providing casing 307 with a cover 309 as indicated by dotted lines in FIG. 18, bellows 305 will be enclosed in a sealed chamber 311. This chamber can be evacuated. The pressure gauge will then become an absolute pressure gauge which reads pressure independently of ambient air pressure. This contrasts with conventional gauges where the entire gauge case has to be evacuated and sealed.

FIG. 19 shows a simplified type of fluid displacement gauge G8 employing an aneroid-type capsule 317 connected to readout tube 42g' containing colored fluid 210 and colorless fluid 300. Alternatively fluid 210 can be dark colored and fluid 300 can be light colored. Tube 42g' is provided with parallel leg 42g'' which terminates at expansion bellows 305'. Bellows 305' serves as a reservoir for the colorless or light-colored fluid. The capsule 317 is enclosed in housing 318 into which pressurized fluid is fed via conduit 319. Upon increase in pressure in housing 318, the capsule contracts. Colored gauging fluid in chamber 300 is driven up tube 42g' to provide a reading at meniscus T on scale 228a. By provision of the expansion bellows this gauge constitutes a wholly closed, hermetically sealed system. This applies also to all the other gauges described herein. All gauges can be used in different positions and need not be limited to vertical position. Furthermore all gauges can have two differently colored gauging fluids instead of just one as shown in some figures. The spring rate of the expansion bellows 305' exerts a minute back pressure on the gauging fluid which is substantially the same in all positions of the gauge.

It is possible to increase the resolution of a readout system by a construction employing split resolution shown in FIG. 20. Here a portion of a readout tube 325 is shown. This tube has one section 326 formed with a larger bore "$D$" and communicating with a smaller bore "$d$" in a succeeding section 328. The smaller increments "$u$" of scale 329 are equivalent in value to the larger increments "$nu$" of scale 330 adjacent the respective tube sections. From an inspection of FIG. 20 it will be apparent that the ratio of increments may be expressed as $nu/u = n = \frac{2}{d^2} = A/a$, where "$a$" and "$A$" are the cross-sectional areas of the smaller and larger bores respectively, and "$n$" is a factor designating the "resolution multiplier." From the above relations it will be noted that the resolution multiplier "$n$" is proportional to the ratio of the tube bore areas. Thus a small bore having one fourth the cross-sectional area of a larger bore will provide four times the readout resolution of the larger bore.

Figure 21:
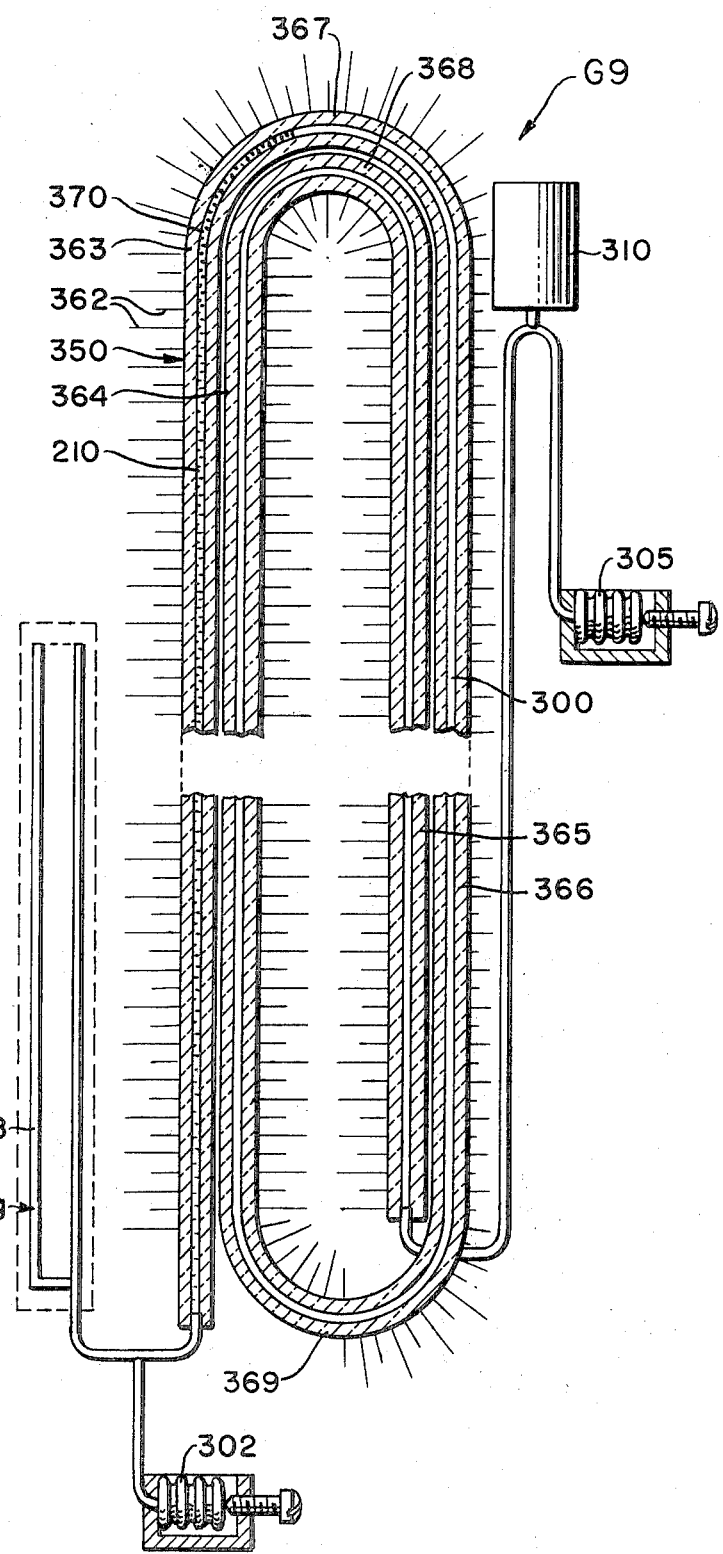

Another way of increasing readout resolution is typically illustrated in FIG. 21 in which pressure gauge G9 is generally similar to gauge G7 of FIG. 18. In gauge G9 a coiled readout tube 350 containing fluids 210 and 300 is provided with a flat coiled scale 362. The tube is coiled in a flat plane. It has two pairs of relatively long straight parallel portions 363,364 and 365,366, two upper curved portions 367,368 and one lower curved portion 369. This tube for example and its associated scale may be approximately 4½ times as long as straight tube 42g' and scale 228a of gauge G7. In the coiled construction a tube and scale can be arranged to occupy a space not materially longer than a single straight tube and scale while providing readout resolution many times greater than the straight tube and scale. It is possible to increase readout resolution still further by employing the principle of split resolution explained in connection with FIG. 20. Thus if one portion 364-369 of tube 350 beyond the first straight portion 363 is formed with a narrower bore 370 than that in portion 363 the resolution will be increased by the factor "$n$" which is the ratio of the larger bore area to the smaller bore area.

It is desirable to improve the accuracy of reading of the scale associated with a transparent readout tube in a fluid displacement pressure gauge. One way of doing this is illustrated in FIGS. 22,23 where transparent tube 380 has a central bore 382 containing colored fluid 210. A grid of closely spaced lines 385 is inscribed in a plate 386 disposed under and parallel to one side of the tube. Lines 385 extend transversely to the axis of bore 382. Scale 386 is inscribed on a flat bar or plate 390 whose upper surface 392 is disposed in a plane parallel to plate 386 and radial to tube 380. The lines 385 of the grid guide the eye of the observer from meniscus T of fluid 210 across one-half of the diameter of tube 380 to the graduations of scale 388 so that the scale is read accurately. In this construction no parallax is encountered.

FIGS. 24 and 25 show a readout arrangement employing a stepped scale 394 inscribed on two levels 395 and 396 of a stepped bar 398. The lower portion 394' of scale 394 underlays the right half of transparent tube 380 while the upper right portion 394" is exposed to the right of the tube. Due to parallax the lines of left portion 394' of the scale will be out of alignment with the lines of the right portion 394" when viewed through transparent tube 380 as clearly shown in FIG. 24. If the observer's eye is then moved to a position perpendicular to the scale the lines of the left and right portions of the scale will align with each other to provide a correct reading of the position of meniscus T of fluid 210.

FIGS. 26 and 27 show a readout arrangement in which transparent readout tube 380 overlays a flat mirror 400 having a reflective layer 402 underneath. A scale 404 is inscribed underneath a transparent plate 406 overlaying the tube and parallel to mirror 400. Due to parallax the lines of scale 404 reflected from mirror 400 will appear at the right half of the tube offset slightly from the lines of the scale on plate 406, as shown clearly in FIG. 26. When the observer views both meniscus T and scale 404 from a position perpendicular to plate 406 the spurious reflected image lines 404' will disappear. There will be no parallax of the lines of the scale viewed to the right of tube 380 because the distortion due to tube 380 is not present there.

Two basic types of temperature compensating arrangements have been described above. One type employs a bimetallic member and the other an expansion element combined with an adjustable bimetallic member. FIGS. 2 and 13 illustrate the first type in which bimetallic members 60 and 160 are shown. Other configurations of bimetallic members are possible but in all cases the thermal load change in the bimetallic member will cause a volume change in the pressure sensing element to compensate for thermal expansion of the gauging fluid. This type of temperature compensator will generally be accurate only in relatively low-pressure applications.

The second type of temperature compensator arrangement is illustrated in FIG. 14 in which bimetallic strip 230 is associated with expansion capsule 236. The bimetallic strip is located in intimate contact with the gauging fluid 210. This is a preferred construction, since location of the bimetallic strip outside the gauging fluid in other compensators will expose the strip to ambient temperature changes which may not be identical to the temperature changes of the gauging fluid inside the gauge. If hot or cold fluids are to be pressure tested the bimetallic member must be located in contact with the gauging fluid to respond properly to temperature changes of the fluid.

FIGS. 28 and 29 illustrate two temperature compensators 425 and 450 employing external bimetallic members. In temperature compensator 425 bimetallic member 426 is bent to a U-shape with one shorter arm 427 and one longer arm 428. The shorter arm is formed with a hole through which extends bolt 430. The bolt extends through a wide slot or hole 423 in wall 434. The bolt is engaged by a washer 431 and nut 432 underneath wall 434. Arm 427 bears on wall 434 which is part of a housing 436 having a chamber 437 containing bellows 438. Gauging fluid 439 enters the housing via a conduit 440. The interior of the bellows is closed off from fluid 439 by a flange 441 secured to the housing at the upper end of the bellows. A pin 442 is secured to inside end wall 443 of the bellows. The end of longer arm 428 bears on the upper end of pin 442. The effective length L of arm 428 can be adjusted by loosening nut 432 and moving member 426 in the direction of its length one way or the other for thermal rate adjustment purposes. Member 426 will move pin 442 axially in or out in response to ambient temperature changes to vary the axial length of the bellows and the amount of fluid 439 entering chamber 437. Conduit 440 will be connected to the chamber containing gauging fluid, such as employed in any of the previously described gauges to effect temperature compensation.

Temperature compensator 450 shown in FIG. 29 is somewhat similar to that of gauge G2 of FIG. 2. However here an individual double-wall aneroid-type capsule is employed. Flexible wall 453 is secured to nipple 454 forming part of wall 456. Conduit 458 conducts gauging fluid 460 to the interior of the capsule. The other wall 462 of the capsule has a central projection 464 on which bears the longer arm 428' of a bent bimetallic member 426'. The shorter arm 427' is secured by bolt 430' to wall 456. The effective length of longer arm 428' is adjustable by loosening nut 432 in the same manner as described in connection with compensator 425 for rate adjustment purposes. The capsule will expand and contract in response to changes in ambient temperature to admit fluid or discharge fluid. The conduit 458 will be connected to the chamber containing gauging fluid to accomplish temperature compensation.

FIG. 30 shows another temperature compensator 475 in which a corrugated bimetallic diaphragm 476 is peripherally secured in opening 478 of one wall 479 of a chamber 480 containing gauging fluid 482. A flexible strip 484 is secured in a block 486 having a slot 487 therein. The block is held on wall 479 by a threaded stud 485 extending through slot 487 and engaged by nut 488 and washer 489. The free end of strip 484 bears on projection 490 extending outwardly of diaphragm 476. Diaphragm 476 will respond to changes in temperature of the gauging fluid to flex inwardly or outwardly and thus compensate for changes in volume of the chamber containing fluid 482. Rate adjustment is accomplished by sliding block 486 and strip 484 longitudinally in the direction of their length to vary length L'.

FIG. 31 shows another pressure gauge G10 which is generally similar to gauge G7 of FIG. 18 and corresponding parts are identically numbered. In gauge G10 provision is made for automatically compensating for changes in pressure due to thermal expansion of fluids 210 and 300. Bellows 305b communicates with the bore of tube 42g' at the location of dark-colored fluid 210, while bellows 305a at the end of tube section 42g'' contains light-colored or colorless fluid 300. The two bellows are identical in structure. They have the same size, cross-sectional area and spring rate. The total volume of colored fluid 210 is made equal to the total volume of colorless fluid 300. The thermal expansion of colored and colorless fluids will be automatically compensated because any contraction of the two fluids will result in feeding equal amounts of both fluids from bellows 305a and 305b respectively into tube 42g'. Any expansion of the fluids will result in equal expansion of the bellows 305a, 305b to withdraw equal amounts of the excess fluids.

In the above arrangement it is necessary that the two fluids have the same coefficient of expansion. If the two fluids have different coefficients of expansion, volume adjustment means 500 can be provided. The volume adjustment means includes a pump in the form of a bellows 504 supported in a frame 506. The bellows is adjustable in volume by a screw 508. The bellows is connected via a conduit 502 to a portion of tube 42g' containing colorless fluid 300. The supply of fluid in bellows 504 can be replenished from or withdrawn into a container or reservoir 510 via a valve 512. By varying the volume of bellows 504, the ratio of total volumes of colored and colorless fluids can be varied inversely proportional to the ratio of the different thermal expansion coefficients of the two fluids. Thus the ratio of total volumes of the two fluids can be so adjusted that the effect of different coefficients of expansion is fully compensated.

Instead of adjustable bellows 504, an adjustable piston 520 can be provided in volume adjustment means 500a as shown in FIG. 32. The piston is slidably disposed in a closed casing 522 containing fluid 300. The piston is adjustable by means of screw 524 engaged in threaded hole 526. The relative volumes of colored and colorless fluids in tube 42g' will be adjusted by varying the position of piston 520. Reservoir 510 is connected to casing 522 via valve 512. In place of valve 512, a pinch spout can be used with either volume adjustment means 500 or 500a. If desired the volume adjustment means 500 or 500a can be connected to a portion of tube 42g' containing dark-colored fluid instead of to the portion containing light-colored fluid as shown in FIGS. 21,32. In any case compensation for different thermal coefficients of expansion will be effected.

While a number of illustrative examples of the invention have been specifically illustrated and described, it will be understood that these have been presented only as exemplary of ways in which the invention can be applied.

What is claimed is:

1. A fluid displacement pressure gauge, comprising: a housing; a pressure responsive tubular element in said housing, said element having elastically flexible walls defining a chamber at least in part; means for applying pressure to be gauged to said walls to cause said chamber to vary in volume in accordance with the magnitude of applied pressure; a core inside said tubular element disposed in axial alignment therewith, opposite ends of said tubular element being secured to the core while an intermediate portion of the tubular element is circumferentially closely spaced from the core to permit circumferential expansion and contraction of said intermediate portion and to suppress meridional stresses while said pressure is applied; a gauging tube communicating at one end thereof with said chamber; a gauging fluid contacting walls of said element and partially filling the gauging tube so that the quantity of gauging fluid in the tube varies in accordance with pressure applied to said element; and means for adjusting to substantial linearity the rate of displacement of gauging fluid in the gauging tube with respect to the variable volume of said chamber.

2. A fluid displacement pressure gauge as defined in claim 1, further comprising means for automatically varying the volume of said chamber to compensate for variations in volume of said gauging fluid caused by variations in temperature of the fluid, so that the pressure reading of the gauging tube is at all times independent of the temperature of the gauging fluid.

3. A fluid displacement pressure gauge as defined in claim 1, further comprising another fluid in said tube contacting a meniscus of said gauging fluid in the tube to prevent portions of the gauging fluid from separating in the tube and to provide hydrostatic balance, the two fluids having different colors so that said meniscus is visible.

4. A fluid displacement pressure gauge as defined in claim 3, further comprising means for automatically compensating for thermal expansion of said fluids; and means for varying the relative quantities of the two fluids in said tube to compensate for any difference between the coefficients of thermal expansion of the two fluids.

5. A fluid displacement pressure gauge as defined in claim 1, wherein said tube has first and second intercommunicating bores, each bore having a uniform cross-sectional area throughout its length, the first bore extending from said one end of the tube and having a larger cross-sectional area than the second bore extending toward the other end of the tube, so that the gauging fluid is displaced in the second bore to a greater longitudinal extent than in the first bore for any given change in volume of said chamber to increase readout resolution of fluid displacement in said tube.

6. A fluid displacement pressure gauge as defined in claim 1, wherein said tube is transparent at least in part so that a meniscus of said gauging fluid is visible in the tube, said pressure gauge further comprising a graduated scale adjacent to the tube; and means for minimizing optical parallax when the meniscus is viewed through the tube to insure accuracy in reading the scale.

7. A fluid displacement pressure gauge as defined in claim 1, wherein said tube is transparent at least in part so that a meniscus of gauging fluid is visible in the tube, said pressure gauge further comprising a graduated scale adjacent the tube, both said tube and said scale being coiled in a plane to maximize the length of said scale and tube while minimizing the overall height of said tube and scale in said plane.

8. A fluid displacement pressure gauge as defined in claim 1, further comprising means for automatically varying the volume of said chamber to compensate for variations in volume of said gauging fluid caused by variations in temperature of the fluid, the last-named means comprising a bimetallic member responsive to changes in its temperature and operatively arranged to vary the volume of said chamber as temperature of the bimetallic member varies, so that the level of the meniscus in the gauging tube is at all times independent of the temperature of said fluid.

9. A fluid displacement pressure gauge as defined in claim 1, further comprising another fluid in said tube contacting a meniscus of said gauging fluid in the tube to prevent portions of the gauging fluid from separating in the tube; and means defining a pressure responsive member connected to the gauging tube and exerting a back pressure on the gauging fluid through said other fluid, and providing hydrostatic balance in the tube, whereby the pressure gauge can be disposed in different positions between vertical and horizontal without thereby causing displacement of the gauging fluid in the tube.

10. A fluid displacement pressure gauge as defined in claim 1, wherein said pressure responsive tubular element has an axial length many times greater than its width so that variations in volume of said chamber are substantially linear with respect to said applied pressure.

11. A fluid displacement pressure gauge as defined in claim 1, said housing having generally cylindrical form and surrounding said pressure responsive element, said housing being axially movable with respect to the pressure responsive element for adjusting to substantial linearity the rate of displacement of gauging fluid in the gauging tube with respect to the variable volume of said chamber.

12. A fluid displacement pressure gauge as defined in claim 11, further comprising means for automatically varying the volume of said chamber to compensate for variations in volume of said gauging fluid caused by variations in temperature of the fluid, the last-named means comprising a bimetallic member responsive to changes in its temperature and operatively arranged to contact said gauging fluid to effect variations in the volume of said chamber as temperature of the fluid varies, so that the position of the meniscus of the gauging fluid in the gauging tube is at all times independent of the temperature of said fluid.

13. A fluid displacement pressure gauge as defined in claim 1, wherein said tubular element and said core define two closely spaced opposing walls between which said pressure is applied.

14. A fluid displacement pressure gauge as defined in claim 13, wherein said chamber is defined between opposing closely spaced walls of said tubular element and said housing.

* * * * *